US006999097B2

(12) United States Patent
Horbelt

(10) Patent No.: US 6,999,097 B2
(45) Date of Patent: Feb. 14, 2006

(54) METHOD OF DISPLAYING A GRAPHIC CONTAINING CONTOURS ON A DISPLAY UNIT

(75) Inventor: Stefan Horbelt, Renens (CH)

(73) Assignee: Siemens Schweiz AG, Zürich (CH)

( * ) Notice: Subject to any disclaimer, the term of this patent is extended or adjusted under 35 U.S.C. 154(b) by 24 days.

(21) Appl. No.: 10/843,350

(22) Filed: May 12, 2004

(65) Prior Publication Data

US 2004/0263527 A1 Dec. 30, 2004

(30) Foreign Application Priority Data

May 15, 2003 (EP) ................................. 03010942

(51) Int. Cl.
*G09G 5/00* (2006.01)
*G09G 5/02* (2006.01)

(52) U.S. Cl. ...................... 345/589; 421/586; 421/593; 348/557; 348/582; 382/162; 382/164

(58) Field of Classification Search ........ 345/418–421, 345/586, 589, 591, 593, 597, 606, 639, 643, 345/644, 611; 382/162–167; 348/557, 560, 348/582, 612
See application file for complete search history.

(56) References Cited

U.S. PATENT DOCUMENTS 5,717,605 A * 2/1998 Komiya et al. ............. 356/406
2001/0028358 A1 10/2001 Tanizawa
2003/0194126 A1 * 10/2003 Shin et al. .................. 382/164

FOREIGN PATENT DOCUMENTS

| | | |
|---|---|---|
| EP | 0710925 | 8/1996 |
| WO | WO 00/46748 | 10/2000 |

* cited by examiner

*Primary Examiner*—Kee M. Tung
*Assistant Examiner*—Wesner Sajous
(74) *Attorney, Agent, or Firm*—Siemens Schweiz AG; Jacob Eisenberg

(57) ABSTRACT

Displaying a graphics such as for example a diagram or a map on a display unit of a portable device requires a reduction in the number of pixels. In each case this requires a decomposition of the graphic into a number of blocks. To do this each block is usually subjected to what is known as "subsampling°. In such cases the semantically important contours disappear at least partly so that the content of the graphic is lost. To resolve this problem to a method is proposed which for a specific application assigns a weighting to the colors underlying the contours. For the reduction in dominant color is determined depending on the result of the weighting and this is simulated in a further procedural step from a set of specified basic and pseudo colors. In this way the semantically important contours of a graphic and thereby the readability are retained despite the fact that reduction has been undertaken.

10 Claims, 1 Drawing Sheet

METHOD OF DISPLAYING A GRAPHIC CONTAINING CONTOURS ON A DISPLAY UNIT

CROSS SECTION TO RELATED APPLICATIONS

The present application claims priority to European Patent Application 03010942.5, filed May 15, 2003, which is herein incorporated by reference.

BACKGROUND OF THE INVENTION

This invention relates to a method for displaying a graphic containing contours on a display unit.

The present invention relates to the area of portable information and communication technology devices. Dictated by the relatively small size and the associated low pixel and color resolution of a display unit on a portable device graphic displays such as conventional images or special graphics must be edited for display. This editing is also necessary for the reduced display of large maps on high-resolution screens or a display with few colors for the purposes of image compression.

In Document WO 00/46748 A1 a method for creating a color descriptor of an image is published: This method includes the following steps:

a) Determining the color vectors of a specified image;

b) Classification of the color vectors in order to determine the dominant color and the interrelationships;

c) Display of the dominant color's and their relationships to each other as a color descriptor of the specified image.

The color descriptor of an image mentioned above includes typical characteristics of an image. The method in accordance with the document WO 00/46748 A1 is used in object-based image processing systems to allow a simpler search and faster location of a specific content or pattern.

As in the document mentioned above the images or graphics are mostly present in an n·m pixel format. Each pixel in this case is assigned a specific position within a grid and a specific color. Graphics such as topographical or geographical maps are mostly originally present in a vector representation. Such maps will however be previously converted into a pixel format of the type mentioned above for publication or for output at a display unit.

Editing the display requires a reduction in the number of pixels. This is normally done by a selection method, referred to technically as <<subsampling>>. In this case methods are used such as formation of averages or a subsampling of a specific pixel from a matrix of for example 4×4 pixels. For example the pixel located in the top left corner of this 4×4-matrix can be used here. These procedures are entirely suitable for images which do not feature any specific contours. The term <<specific contours>> includes the fact that these contours are assigned a defined semantic such as for example in the area of topography in accordance with the representation shown below in Table 1.

TABLE 1

Semantic of the colors with regard to the contours

| Contour | Semantic |
|---|---|
| Blue line | River, stream |
| Blue line which delimits a light blue surface. | Shore of a lake |
| Thin black line | Co-ordinate grid |
| Thin brown Line | Height contour |
| Green line which delimits a light green surface. | Woodland edge |

The disadvantage of the above-mentioned methods of displaying such graphics is that, because of the absence of these contours the readability is significantly adversely affected. The term contour used above and its significance is in no way restricted here to cartography but can for example also be applied to other graphics such as for example a graph curve or a temperature curve within a Cartesian co-ordinate system.

The negative effects in the presentation of a graphic in a pixel display such as for example anti-aliasing can also be rectified by what is known as <<super sampling>>. <<Super sampling>> means that the pixels are initially edited in a memory. In this case this memory is virtually assigned a higher resolution than the actual resolution on the display unit. The disadvantage of this method (also called: <<super sampling method of anti-aliasing>>) is the high memory requirement and the associated high computing power. To ameliorate the problem of a high memory requirement somewhat it is proposed in EP 1 056 047 A1 to remedy this by a weighted decomposition into three basic colors and a subsequent linear combination of the colors for each pixel. However this does not display colors with a specific significance any better since even at the high resolution the individual elements are present as <<areas>> and not as contours.

The method described in WO 00/46748 A1 is therefore not suitable for contour-containing reduction of an image because it is to be applied above all to a large monochrome regions: Fine contours especially get lost in filtering as noisy pixels>>, see WO 00/46748 A1, Page 4 for more information.

SUMMARY OF THE INVENTION

An object of the present invention is thus to specify an easy-to-implement method for displaying a graphic containing contours on a display unit, in which the contours are even retained for a reduction to a display with lower resolution.

This and other objects are achieved in accordance with the invention by the method specified in Patent claim 1.

By the steps i) to v) of the method in accordance with invention, whereby through i) Assignment of a weighting of the colors representing the contours and the surfaces is undertaken, with the weighting being undertaken by a factor $f_c$ determined by the colors C;

ii) decomposition of the graphic G into blocks $B_{ij}$, which each feature a·b pixels; with a standing for number of pixels of a row and b for the number of pixels of a column of a block $B_{ij}$, iii) Determining the dominant color C of each block $B_{ij}$ on the basis of the weighting undertaken in procedural step A;

iv) Mapping of the dominant color C of each Block $B_{ij}$ to a pixel, in which case the dominant color C is created from basic colors.

v) Recomposition of the graphic G from the pixels determined in procedural step C.

It is ensured that the contours contained in the graphic G are retained on reduction to a lower resolution.

The weighting of the colors C representing the contours can be undertaken previously in procedural step i) depending on the relevant application such as a diagram with a pillar or line design or a map. This allows the subsequent procedural steps to be applied in many diverse ways independent of the specific semantic inherent to the contours of the graphic.

The invention is not restricted to portable devices but can be used wherever a graphic containing contours is to be shown on a relatively small display such us for example a navigation system in a means of transport, typically an automobile.

BRIEF DESCRIPTION OF THE SEVERAL VIEWS OF THE DRAWINGS

The invention is explained below in more detail on the basis of the drawing. The drawing shows.

DETAILED DESCRIPTION OF THE INVENTION

Figure 1:
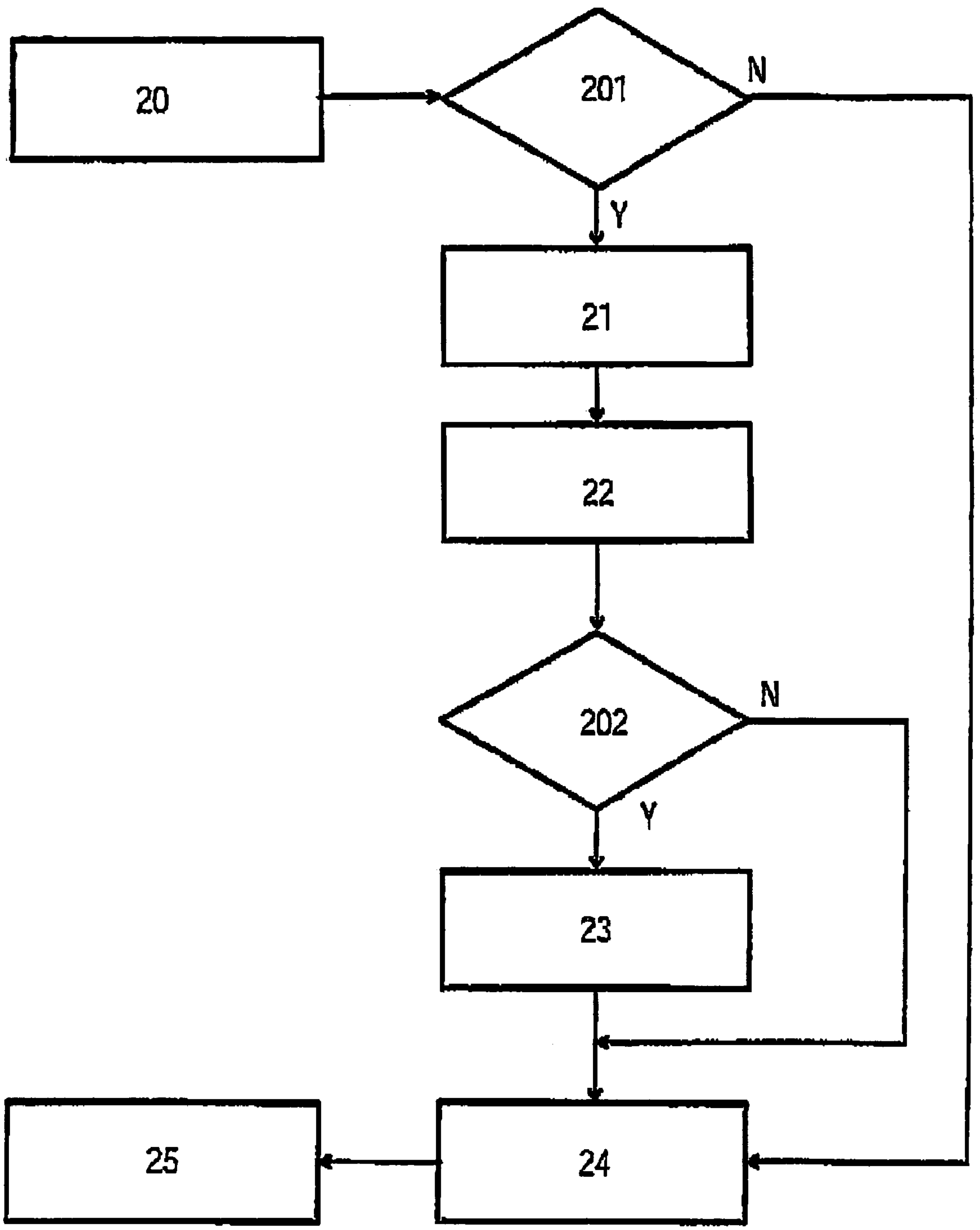
FIG. 1 Flowchart for processing a block section.

It is assumed that the graphic to be a displayed his present in a pixel display of n·m pixels; in this case a color C is assigned to each pixel. Initially a plurality of blocks $B_{ij}$ is created from the graphic G to be shown on a display unit, with the indices running in each case over $i \in \{1, \ldots, M\}$ and $j \in \{1, \ldots, N\}$. The graphic G thus produces the equation:

$$\mathfrak{G} := [B_{ij}] \text{mit } i \in \{1, \ldots, M\};\ j \in \{1, \ldots, N\}.$$

A block $B_{ij}$ contains on one hand a·b pixels, preferably a=b, applies here, which means that the blocks $B_{ij}$ are quadratic. Typical values for a and b are 1, 2, 4 or 8. For the above variables the following relationship applies for an exact decomposition $$n = N \cdot a;$$

$$m = M \cdot b.$$

N, M contain—as formally specified above—the number of blocks per row or per column respectively of graphic G.

If an exact decomposition of this type is not possible then for the example a few pixels at the edge of the rectangular graphic G are ignored. Since for the variables n and m values of between typically 600 and 1800 are provided, a very small loss is produced with the specified values for a and b as regards the display of the graphic G on a display unit. The above-mentioned values only represent examples, for large TFT flat screens larger values are also to be provided.

Each block formed in its way $B_{ij} \in G$ when will be subjected to the procedural steps in accordance with FIG. 1 as shown below.

Block 20

Selection of a block $B_{ij} \in G$.

Branch 201

Query: Reduction of the number of pixels. This branch its optional for the No case (reference symbol N) and merely represents a back up so that a graphic reduced or made smaller in accordance with the inventive method is not subjected to this method for the second time. In the Yes case (reference symbol Y) the number of pixels is reduced in accordance with the operations specified in the following blocks 21, 22.

In block 21 different colors C of the underlying block $B_{ij}$ are counted.

Subsequently in block 22 the dominant color is determined. This is done by weighting the colors counted in block 21. So called surface colors such as for example a light green (wooded area) or light blue (sea surface) have the lowest weight. Contours or the assigned colors such as black or dark blue have the highest weight. This method ensures that the contours are not lost on averaging or reduction to fewer pixels. Without this weighting for example a coordinate line within a light green area but representing a wood would at least partly disappear. For the weighting of the colors C the factors $f_c$ listed in Table 2 will be included. In this table a distinction is made between basic colors C and so-called pseudo colors C. These factors $f_C$ are to be specified for a specific map in what is known as "hard coded" form. Depending on the type of map or the national circumstances the basic colors have another meaning. The weighting and the establishment of the table are therefore undertaken in advance for a specific application and not just at "runtime" of the procedure.

TABLE 2

Weighting by factors $f_c$ of the basic and pseudo colors as a result of their meaning/semantics.

| | Factor $f_c$ | Meaning |
|---|---|---|
| Basic color C | | |
| White | −2 | Background |
| Green | 1 | Woodland edge |
| Blue | 0 | Rivers, streams |
| Brown | 2 | Height line |
| Black | 2 | Roads |
| Pseudo color C | | |
| Light green | −2 | Woodland area |
| Light blue | −2 | Sea surface |
| Yellow | 0 | Narrow road |
| Orange | 0 | National class 1 highway |
| Red-orange | 0 | National border |
| Red | 0 | Major road |
| Dark red | 0 | Railway line |

For determining the weighted average the procedures in this exemplary embodiment are as follows:

The weight $g_C$ of a color C is calculated using the following formula:

$$g_C := h_C + f_C \cdot f_s \quad F_1$$

where $h_C$ Number of pixels with the color C;

$f_C$ Factor of the color C;

$f_s$ quadrated scaling factor $F_s/4$.

The quadrated scaling factor $F_s$ is produced by the pixel format to be reduced, in the present example from $$F_s = 4 \cdot 4 = 16.$$

The formula given here $F_1$ for calculating the weight $g_C$ of a color C is explained on the basis of an example for a block $B_{ij}$ of 4·4 pixels in Table 3:

TABLE 3

| Calculating the weight $g_c$ of a color C. | | | |
|---|---|---|---|
| Color C | Number $h_c$ of the pixels with the color C | Formula with numbers | Weight $g_c$ of the color C |
| Black | 5 | 5 + 2 * 4 | 13 |
| Light green | 9 | 9 − 1 * 4 | 5 |
| Green | 2 | 2 + 1 * 4 | 6 |
| | 16 | | |

This means that determining the dominant color produces the color black. It should be pointed out at this juncture that the formula given here $F_1$ for the weight $g_C$, represents an example of weighting. It would also be possible to perform the weighting purely multiplicatively and not mixed as in the formula given here.

For the branch 202 following block 22 it is possible to make this branch solely on the basis of the decision for the dominant color or the found weights $g_C$. for the different colors en bloc.

There now follows the further branch 202 already mentioned. Here, if the number of pixels of the dominant color black is less than the total number of pixels in a block $B_{ij}$, a color representation is generated according to the following table. To simplify the representation in this case only a size of 2·2 pixels is assumed for a block $B_{ij}$ here.

TABLE 4

| Creation of anti-aliasing colors | |
|---|---|
| Number of pixels of the dominant color black | Mapping to a pixel of the color |
| 4 | Black |
| 3 | Black |
| 2 | Brown |
| 1 | Brown |

In the case of 4 pixels the color black is assigned directly to the pixel concerned.

In block 23 (=anti-aliasing with weighting) it is established which of the basic colors available best represents the dominant color and the found weights. In this example this only applies for the color black with its anti-aliasing brown, since no anti-aliasing is available for the other colors. For these colors however the pseudo colors can be used as anti-aliasing.

Because of the previously determined colors per "reduced" block $B_{ij}$ the color is therefore determined in block 24 on the basis of the "basic colors" available for a display unit. In the case considered here this is the first five lines of Table 5.

TABLE 5

| Creating pseudo colors from the basic colors. | | | | | | |
|---|---|---|---|---|---|---|
| Color C (input) | Color (output) | White W | Green G | Blue B | Brown N | Black Z |
| White | W100 | 100% | | | | |
| Green | G100 | | 100% | | | |
| Blue | B100 | | | 100% | | |
| Brown | N100 | | | | 100% | |
| Black | 2100 | | | | | 100% |
| | Pseudo colors | | | | | |

TABLE 5-continued

| Creating pseudo colors from the basic colors. | | | | | | |
|---|---|---|---|---|---|---|
| Color C (input) | Color (output) | White W | Green G | Blue B | Brown N | Black Z |
| Light green | W50G50 | 50% | 50% | | | |
| Light blue | W75B25 | 75% | | 25% | | |
| Yellow | W50N25Z25 | 50% | | | 25% | 25% |
| Orange | W50N50 | 50% | | | 50% | |
| Red-orange | G25N75 | | 25% | | 75% | |
| Red | N10D | | | | 100% | |
| Dark red | N50Z50 | | | | 50% | 50% |

The second column of Table 5 specifies the output in a coded form for a specific color in the first column. The columns with the headings "White W", "Green G", etc. specify the encoding/weighting on the basis of the available basic colors C. Instead of the term encoding/weighting this generation of pseudo colors is also referred to a specified linear combination of basic colors.

EXAMPLE 1

Creation of W50N25Z25 by Means of Color Dithering in a 2·2 Dithering Block the Colors are Arranged as Follows

TABLE 6

| 2 · 2 Dithering-Block $D_{W50N25Z25}$ (i, j) | |
|---|---|
| White | Brown |
| Black | White |

EXAMPLE 2

Creation of W66B34 by Means of Color Dithering

In a 3·3 Dithering Block the Colors are Arranged as Follows

TABLE 7

| 3 · 3 dithering block $D_{W66B34}$ (i, j) | | |
|---|---|---|
| Blue | White | White |
| White | White | Blue |
| White | Blue | White |

The following comment should also be made here: Blocks $B_{ij}$ with identical colors but different positions (i,j) create another color with color dithering. For example when the. dithering block W66B34 is used the color $D_{W66B34}$ (i mod 3, j mod 3) is created.

If with branch 201 the decision is made not to perform any reduction, then in block 24 for the pixels concerned the color C is merely determined from the specified basic colors in accordance with Table 5.

Block 25 contains the resulting representation (output) for a pixel as a result of input 20 (=Input) for a block $B_{ij} \in G$ of the graphic to be displayed G.

The sequence in accordance with FIG. 1 represents an execution sequence for a block $B_{ij}$ or in the case of the non-reduction for a pixel. To display a graphic G the sequence shown in FIG. 1 is run iteratively. The steps of the decomposition into blocks $B_{ij}$ as well as the recomposition of the graphic G from the pixels created in this way represent an expert measure and are thus not explained in any greater detail in this publication. Likewise no further details are provided about the transformation of the graphic G in a vectorized form into the pixel form previously mentioned.

The exemplary embodiment given above merely represents an implementation of the method in accordance with the invention. Depending on the display options, the inventive method can be performed on a display unit with other colors C and with other numbers of basic colors. The weighting of the colors C is only conditionally linked to the relevant semantics and accordingly to a specific application. It is also possible to index the specified so-called "hard-coded" Tables, with each index standing for a specific application. In a similar way to that shown in Table 8 graphics G that differ very widely in type and semantic can be automatically reduced with the same method to cater for the options provided by a display unit so that the importance of the individual elements such as the contours of the relevant graphic G in particular are retained.

TABLE 8

Index for indexing Tables 1, 2 and 4.

| Index | Application |
|---|---|
| 0 | Map representation in CH semantics. |
| 1 | Map representation in IT semantics. |
| 2 | Representation of temperature curves. |
| 3 | Representation of stock market indices. |
| . | . |
| . | . |
| . | . |

The next few pages show the code of the exemplary embodiment for showing a geographical map in the C Language.

Code in programming language C of the sequence shown in FIG. 1

```
//////////////////////////////////////////////////////////////////////////
//Weighted Anti-aliasing and Color Dithering code
//////////////////////////////////////////////////////////////////////////
#define WHITE 0
#define BROWN 1
#define BLUE 2
#define BLACK 3
#define GREEN 4
#define DARK_GREEN 5
#define DARK_BLUE 6
#define RED 7
#define DARK_RED 8
#define YELLOW 9
#define GRAY 10
#define ORANGE 11
#define RED_ORANGE 12
//Dithered colors:
//Light Green: Combinations of White and Green
#define WHITE75_GREEN25 20
#define WHITE50_GREEN50 21
#define WHITE25_GREEN75 22
#define BLACK25_GREEN75 27
//Light Blue: Combinations of White and Blue
#define WHITE75_BLUE25 30
#define WHITE50_BLUE50 31
#define WHITE25_BLUE75 32
#define BLACK25_BLUE75 37
//Light Black: Combinations of white and black
#define WHITE75_BLACK25 40
```

-continued

```
#define WHITE50_BLACK50 41
#define WHITE25_BLACK75 42
//Light Brown: Combinations of White and browN
#define WHITE75_BROWN25 50
#define WHITE50_BROWN50 51
#define WHITE25_BROWN75 52
#define WHITE62_BROWN38 53
#define WHITE67_BROWN33 54
#define WHITE50_BROWN25_BLACK25 55
#define BLACK50_BROWN50 58
//Combination of Green and browN:
#define GREEN75_BROWN25 60
#define GREEN50_BROWN50 61
#define GREEN25_BROWN75 62
void Tile::Write_all( )
{
    Strip_index Strip = 0;
    // Before saving images apply Anti-Aliasing routine
    Anti_aliasing( );
    while (Strip < Temp_Tile_Side) {
        write (Strip);
        Strip += Scale_Change;
    }
    Empty_all ( );
}
void Tile::Anti_aliasing( )
{
    //Apply Anti-aliasing only if there is a scale change.
    //Otherwise do only color dithering;
    if (Scale_Change == 1) {
        Dither_tile( );
        return;
    }
    const int Scale_square_2 = Scale_Change * Scale_Change / 2.0;
    const int Scale_square_4 = Scale_Change * Scale_Change / 4.0;
    int colors_num = 13;
    int colors[16];
    int max, i;
    int dominant_color, color;
    int colors_add[16];
    int PixelIndex;
    //Initialize counter of pixel colors:
    for (i = 0; i < colors_num; i++) {
        colors_add[i]=0;
    }
    // Emphasize BROWN and BLACK:
    colors_add[BROWN] = Scale_square_4;
    colors_add[BLACK] = Scale_square_4;
    // Little Emphasize for DARK_GREEN and DARK_BLUE:
    colors_add[DARK_GREEN] = Scale_square_4/2;
    colors_add[DARK_BLUE] = 0;
    // Penalty for surface colors:
    colors_add[WHITE] = -Scale_square_4;
    colors_add[GREEN] = -Scale_square_4;
    colors_add[BLUE] = -Scale_square_4;
    //Double loop over all tiles:
    for ( int y = 0, yEven = 1, yEven3 = 1;
        y < Temp_Tile_Side;
        y += Scale_Change, yEven = 1 - yEven)
        {
        if( ++yEven3 >= 4) {yEven3 = 0;}
        for ( int x = y * Temp_Tile_Side, xEven = 1, xEven3 = 1;
            x < (y+1) * Temp_Tile_Side;
            x += Scale_Change, xEven = 1 - xEven)
            {
            if( ++xEven3 >= 4) {xEven3 = 0;}
            // Count colors in pixel block
            for (i = 0; i < colors_num; i++) {
                colors[i] = 0;
            }
            for (int x0 = 0; x0 < Scale_Change; x0++){
                for (int y0 = 0; y0 < Scale_Change; y0++){
                    colors[Tile_pixels[x + x0 + y0 *
                    Temp_Tile_Side]]++;
                }
            }
            // Find color with maximum count:
            dominant_color = WHITE;
            max = 0;
```

-continued

```
            for (i = 0; i < colors__num; i++) {
                colors[i] += colors__add[i];
                if(colors[i] >= max) {
                    max = colors[i];
                    dominant__color = i;
                }
            }
            //Antialiasing of BLACK color: IF BLACK is not
            //omnipresent replace it by BROWN:
            if(dominant__color == BLACK) {
                if(colors[WHITE] >= Scale__square__4 &&
                 colors[WHITE] < Scale__square__2 &&
                 colors[BLACK] >= Scale__square__2) {
                    dominant__color = BROWN;
                }
            }
            //Color dithering using the dithering pattern:
            dominant__color = Dither__color(dominant__color, xEven,
            yEven, xEven3, yEven3);
            // Set dominant__color in a pixel block
            // with side length Scale__change:
            for (int y0 = 0; y0 < Scale__Change; y0++){
                PixelIndex = x + y0 * Temp__Tile__Side;
                for (int x0 = 0; x0 < Scale__Change;
                    x0++, PixelIndex++){
                    Tile__pixels[PixelIndex] = dominant__color;
                }
            }
        }
    }
}
//Dithering without down scaling:
void Tile::Dither__tile( )
{
    srand(1);
    int PixelIndex;
    for ( int y = 0, yEven = 1, yEven3 = 1;
        y < Temp__Tile__Side;
        y++, yEven = 1 − yEven)
        {
        if( ++yEven3 >= 4) {yEven3 = 0;}
        PixelIndex = y * Temp__Tile__Side;
            for ( int x = 0, xEven = 1, xEven3 = 1;
                x < Temp__Tile__Side;
                x++, PixelIndex++, xEven = 1 − xEven)
                {
                if( ++xEven3 >= 4) {xEven3 = 0;}
                Tile__pixels[PixelIndex] =
                    Dither__color(Tile__pixels[PixelIndex],
                            xEven, yEven, xEven3, yEven3);
            }
    }
    return;
}
//The toggle even allows to select the position in the dithering pattern;
//Even toggles every bit between 0 and 1.
//Even3 changes every bit from 0 to 1 to 2 and then start over again.
int Tile::Dither__color(int color, int xEven, int yEven, int xEven3, int
yEven3)
{
switch(color) {
case WHITE:
    break;
case BLACK:
    break;
case BROWN:
    break;
case YELLOW:
    color = WHITE50__BROWN25__BLACK25;
    break;
case ORANGE:
    color = WHITE50__BROWN50;
    break;
case RED__ORANGE:
    color = GREEN25__BROWN75;
    break;
case RED:
    color = BROWN;
    break;
```

-continued

```
case DARK__RED:
    color = BLACK;
    break;
case BLUE:
    color = WHITE75__BLUE25;
    break;
case DARK__BLUE:
    color = BLUE;
    break;
case GREEN:
    color = WHITE50__GREEN50;
    break;
case DARK__GREEN:
    color = GREEN;
    break;
}
//For simple color return immediatley:
if(color <= RED__ORANGE) {
return color;
}
// For pseudo color generate dithering pattern:
 switch(color) {
    //Light Green: Combinations of White and Green -----------------
 case WHITE75__GREEN25:
        // 75% WHITE and 25% GREEN
        if((yEven == 1) || (xEven == 1) ) {
            color = WHITE;
        } else {
            color = GREEN;
        }
        break;
 case WHITE50__GREEN50:
        // 50% WHITE and 50% GREEN
        if(yEven == xEven) {
            color = WHITE;
        } else {
            color = GREEN;
        }
        break;
case WHITE25__GREEN75:
        // 25% WHITE and 75% GREEN
        if((yEven == 1) && (xEven == 1) ) {
            color = WHITE;
        } else {
            color = GREEN;
        }
        break;
case BLACK25__GREEN75:
        // 25% BLACK and 75% GREEN
        if((yEven == 1) && (xEven == 1) ) {
            color = BLACK;
        } else {
            color = GREEN;
        }
        break;
    //Light Blue: Combinations of White and Blue -------------------
case WHITE75__BLUE25:
        // 75% WHITE and 25% BLUE
        if((yEven == 1) || (xEven == 1) ) {
            color = WHITE;
        } else {
            color = BLUE;
        }
        break;
case WHITE50__BLUE50:
        // 50% WHITE and 50% BLUE
        if(yEven == xEven) {
            color = WHITE;
        } else {
            color = BLUE;
        }
        break;
case WHITE25__BLUE75:
        // 25% WHITE and 75% BLUE
        if((yEven == 1) && (xEven == 1) ) {
            color = WHITE;
        } else {
```

-continued

```
            color = BLUE;
        }
        break;
case BLACK25__BLUE75:
        // 25% BLACK and 75% BLUE
        if((yEven == 1) && (xEven == 1) ) {
            color = BLACK;
        } else {
            color = BLUE;
        }
        break;
    //Light Black: Combinations of White and blacK ------------------
case WHITE75__BLACK25:
        // 75% WHITE and 25% BLACK
        if((yEven == 1) || (xEven == 1) ) {
            color = WHITE;
        } else {
            color = BLACK;
        }
        break;
case WHITE50__BLACK50:
        // 50% WHITE and 50% BLACK
        if(yEven == xEven) {
            color = WHITE;
        } else {
            color = BLACK;
        }
        break;
 case WHITE25__BLACK75:
        // 25% WHITE and 75% BLACK
        if((yEven == 1) && (xEven ==1) ) {
            color = WHITE;
        } else {
            color = BLACK;
        }
        break;
    //Light Brown: Combinations of White and browN ------------------
 case WHITE75__BROWN25:
        // 75% WHITE and 25% BROWN
        if((yEven == 1) || (xEven == 1) ) {
            color = WHITE;
        } else {
            color = BROWN;
        }
        break;
 case WHITE50__BROWN50:
        // 50% WHITE and 50% BROWN
        if(yEven == xEven) {
            color = WHITE;
        } else {
            color = BROWN;
        }
        break;
 case WHITE25__BROWN75:
        // 25% WHITE and 75% BROWN
        if((yEven == 1) && (xEven == 1) ) {
            color = WHITE;
        } else {
            color = BROWN;
        }
        break;
case WHITE62__BROWN38:
        // 37.5% BROWN and 62.5% WHITE
        if(yEven3 == xEven3 || (yEven3 + xEven3 == 2)) {
            color = BROWN;
        } else {
            color = WHITE;
        }
        break;
case WHITE67__BROWN33:
        // 33% BROWN and 67% WHITE
        if(yEven3 == xEven3) {
            color = BROWN;
        } else {
            color = WHITE;
            if(yEven3 == 0 && xEven3 == 1) {
                color = BROWN;
```

-continued

```
                }
            }
            break;
case WHITE50__BROWN25__BLACK25:
    // 25% BROWN, 25% BLACK and 50% WHITE
        if((yEven == xEven) ) {
            color = BROWN;
            if (yEven == 1) {
                color = BLACK;
            }
        } else {
            color = WHITE;
        }
        break;
 case BLACK50__BROWN50:
        // 50% BLACK and 50% BROWN
        if(yEven == xEven) {
            color = BLACK;
        } else {
            color = BROWN;
        }
        break;
    //Combination of Green and browN: --------------------
 case GREEN75__BROWN25:
        // 75% GREEN and 25% BROWN
        if((yEven == 1) || (xEven == 1) ) {
            color = GREEN;
        } else {
            color = BROWN;
        }
        break;
 case GREEN50__BROWN50:
        // 50% GREEN and 50% BROWN
        if(yEven == xEven) {
            color = GREEN;
        } else {
            color = BROWN;
        }
        break;
 case GREEN25__BROWN75:
        // 25% GREEN and 75% BROWN
        if((yEven == 1) && (xEven == 1) ) {
            color = GREEN;
        } else {
            color = BROWN;
        }
        break;
}
 return color;
```

The following is a list of reference characters and variable values used:

$B_{ij}$ Block of a b Pixel; $B_{ij} \in G$, a Number of pixels of a row of a block $B_{ij}$, b Number of pixels of a column of a block $B_{ij}$, G Graphic to be displayed or decomposed, i Running row index of the graphic to be decomposed into blocks $B_{ij}$, j Running column index of the graphic to be decomposed into blocks $B_{ij}$, n Number of pixels of a row of the graphic to be displayed, m Number of pixels of a column of the graphic to be displayed, N Number of blocks $B_{ij}$ of a row of the graphic to be decomposed, and M Number of blocks $B_{ij}$ of a column of the graphic to be decomposed.

The following is a list of the acronyms used:

TFT Display Thin Film Transistor Display.

I claim:

1. A method of displaying a graphic comprising contours and surfaces on a display unit, with the graphic being present in the form of m·n pixels and a color being assigned to each pixel; where n stands for the number of pixels of a row and m stands for the number of pixels of a column of the graphic to be displayed, comprising the steps of:

i) Assigning a weight to the colors representing the contours and colors representing the surfaces, with the weight being undertaken by a factor $f_c$ determining each color C;

ii) Decompositing the graphic into blocks each featuring a·b pixels; with a standing for the number of pixels of a line and b standing for the number of pixels of a column of a block;

iii) Determining a dominant color C of each block on a basis of the weight undertaken in procedural step i);

iv) Mapping the dominant color C of each block ($B_{ij}$) to a pixel, in which case the dominant color C is created from basic colors; and v) Recompositing the graphic from the pixel determined in procedural step iv).

2. The method according to claim 1, wherein in procedural step iii) the color determined as the dominant color C is one that has the highest factor $f_c$ for the weighting.

3. The method according to claim 1, wherein weighting of the colors C is undertaken with factors $f_c$ stored in a data structure.

4. The Method in accordance with claim 3, wherein the data structure contains a semantic assigned to the colors C.

5. The method according to claim 3, wherein the weight g0 of a color C is calculated in accordance with to following formula:

$$g_c := h_c + f_c \cdot f_s$$

whereby:

$h_c$ is a number of pixels with the color C;

$f_c$ is a factor of the color C; and $f_s$ is a quadrated scaling factor, where the scaling factor is determined from the pixel format to be reduced.

6. The method according to claim 5, wherein in procedural step iv) a selection is made from the weights $g_c$ of the number of pixels with the color C of those colors from the available basic colors C or pseudo colors C, which approximate most closely to a dominant color, in which case a pseudo color is defined by a specified linear combination of basic colors.

7. The method according for a plurality of graphics to claim 1, wherein the graphics (G) are indexed in accordance with applications, and with the contours of the application accordingly featuring a specific semantic in each case and the procedural steps ii) and iii) for each index k featuring a separate implementation.

8. The method according to claim 1, wherein in procedural step i) the blocks ($B_{ij}$) are dimensioned with a=b.

9. The method according to claim 2, wherein weighting of the colors C is undertaken wit factors $f_c$ stored in a data structure.

10. The method according to claim 4, wherein the weight g0 of a color C is calculated in accordance with the following formula:

$$g_c := h_c + f_c \cdot f_s$$

whereby:

$h_c$ is a number of pixels with the color C;

$f_c$ is a factor of the color C; and $f_s$ is a quadrated scaling factor, where the scaling factor is determined from the pixel format to be reduced.

* * * * *